Jan. 6, 1970 T. P. NENNINGER ET AL 3,488,451

CALL TRANSMITTER

Filed April 5, 1967 3 Sheets-Sheet 1

INVENTORS T. P. NENNINGER
L. SCHENKER

BY Harry L. Newman

ATTORNEY

Jan. 6, 1970 T. P. NENNINGER ET AL 3,488,451

CALL TRANSMITTER

Filed April 5, 1967 3 Sheets-Sheet 2

Jan. 6, 1970 T. P. NENNINGER ET AL 3,488,451

CALL TRANSMITTER

Filed April 5, 1967 3 Sheets-Sheet 3

United States Patent Office 3,488,451

Patented Jan. 6, 1970

3,488,451

CALL TRANSMITTER

Theodore P. Nenninger, East Brunswick, and Leo Schenker, Colts Neck, N.J., assignors to Bell Telephone Laboratories, Murray Hill, N.J., a corporation of New York Filed Apr. 5, 1967, Ser. No. 628,738
Int. Cl. H04m *1/26*
U.S. Cl. 179—90 10 Claims

ABSTRACT OF THE DISCLOSURE

The call transmitter is described that includes a multifrequency signal generator that is selectively tunable by the respective connection of a pair of capacitors across selected portions of a pair of tapped windings. The call transmitter further includes a plurality of keys, and the actuation of any key connects each capacitor across a pair of taps on its associated winding that are common to all keys and enables the multifrequency signal generator. In addition, the actuation of any key selects taps on the windings that are peculiar to the actuated key and actuates a first timing circuit. After the elapse of a predetermined period of time, the first timing circuit energizes a relay that disables the signal generator and activates a second timing circuit. The second timing circuit after the elapse of a predetermined period of time energizes another relay that transfers the capacitors from the common taps to the peculiar taps on the windings and again enables the signal generator.

FIELD OF THE INVENTION

This invention relates to the field of communications and within that field to apparatus for transmitting signals that serve to establish a connection between two or more terminals of a communications system. Such an apparatus is referred to in the telephone art as a call transmitter, and while that term will be employed herein and the invention will be described in terms of telephone communications, it is to be understood that the invention is not so limited but may find use in all areas of communications.

DESCRIPTION OF THE PRIOR ART

In a telephone communication system, the signals transmitted by a call transmitter operate the switched network of a central office, the switched network connecting the calling station with the station indicated by the transmitted signals. As the telephone system has grown, the number of signals required to establish a connection between stations has increased. Thus today it is necessary in many states to dial a 10 digit number in order to call a station in another part of the state.

To save telephone users the bother of having to remember the numbers associated with frequently called stations and the bother of transmiting the signals corresponding to the numbers, call transmitters have been designed that are capable of storing such information and transmitting it on command. Such call transmitters, commonly referred to as repertory dialers, include a memory, means for scanning the memory, means for translating the information stored in the memory, and means under the control of the translating means for generating signals. While automatic call transmitters of this nature provide a real convenience, they are expensive and complicated pieces of apparatus.

Recently, the central office switched network has reached a point of sophistication that permits it to provide a central memory for the stations connected thereto. In this arrangement, referred to as abbreviated dialing, frequently called telephone numbers are stored in the memory of the switched network in a particular numbered order. A stored telephone number can then be called by merely dialing the access code of the memory and then dialing the order number of the desired telephone number. The memory, which is called into operation by the access code, recognizes the calling station and automatically interconnects the calling station with the station corresponding to the selected order number.

SUMMARY OF THE INVENTION

A call transmitter is herein disclosed that is particularly adapted to operate in conjunction with the aforedescribed arrangement. The call transmitter of this invention includes a plurality of keys, each of which is associated with an individual telephone number and each of which when operated causes the sequential generation of first the access code of the memory of the switched network and then the order number of the telephone number associated with the key.

The call transmitter comprises a multifrequency signal generator having a frequency determining circuit that is tunable by the connection of one of a plurality of tuning taps to a terminating tap. A first means responsive to the actuation of each key selects one or more tuning taps peculiar to the actuated key. A second means responsive to the actuation of each key sequentially connects one or more tuning taps common to all of the keys to the terminating tap and then sequentially connects the tuning taps peculiar to the actuated key to the terminating tap.

DETAILED DESCRIPTION OF THE INVENTION

Figure 1:
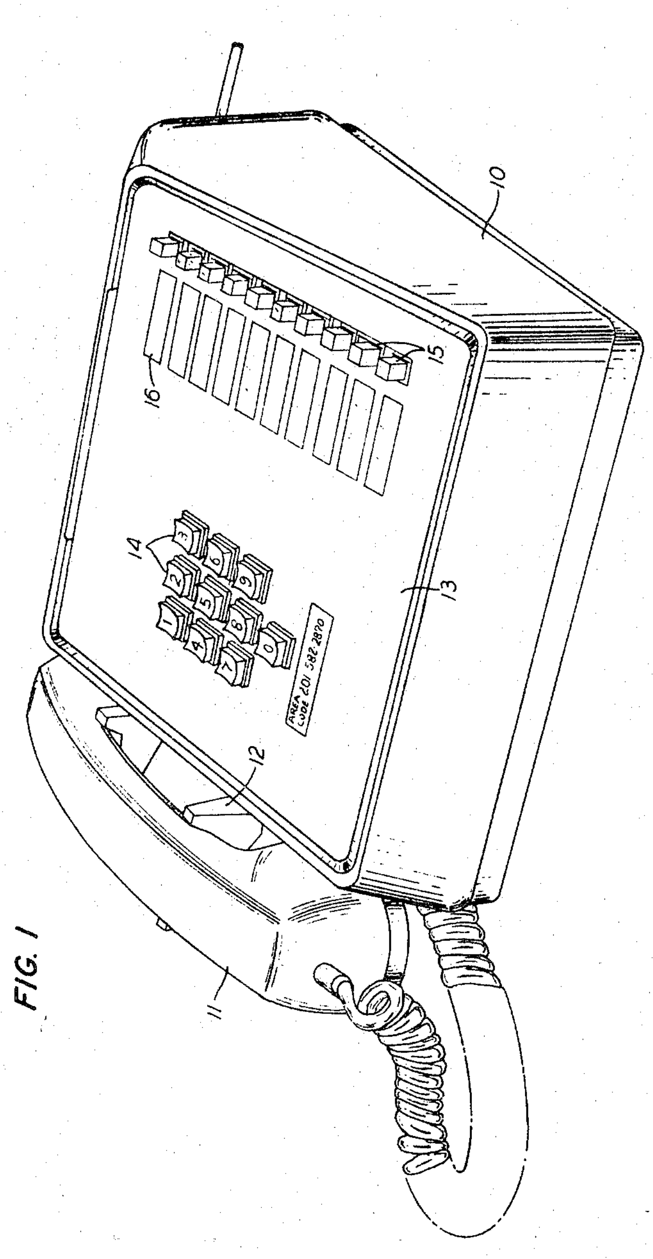
FIG. 1 is a perspective view of a telephone set incorporating the call transmitter of the present invention.

Referring to the drawing, FIG. 1 shows a telephone set comprising a base 10 and a handset 11, the handset when not in use being placed on a cradle 12 extending from the side of the base. The cradle 12 operates the hook switch mechanism of the telephone set, the cradle being deflected downward when the handset is placed thereon and moving upward when the handset is removed therefrom.

The base 10 includes an inclined face plate 13 through which elements of the call transmitter protrude. Among these elements is a rectangular array of ten pushbuttons 14 that are part of a pushbutton dial. The pushbuttons 14 each have one of the digits 1 through 0 appearing thereon indicating the particular digit that each of these pushbuttons represent, and the pushbuttons are employed in the manual dialing of a telephone number.

Also extending through the face plate 13 is a column of plunger type keys 15. To the side of each key 15 is a window through which a tab 16 is visible. The face plate 13 is removable to provide access to the tabs 16 to permit the recording of the name of an individual subscriber on each tab. Each key 15 is employed in the automatic transmission of an abbreviated group of signals that cause the memory of a central office to establish a connection with the subscriber whose name appears on the tab 16 adjacent to the key.

Figure 2:
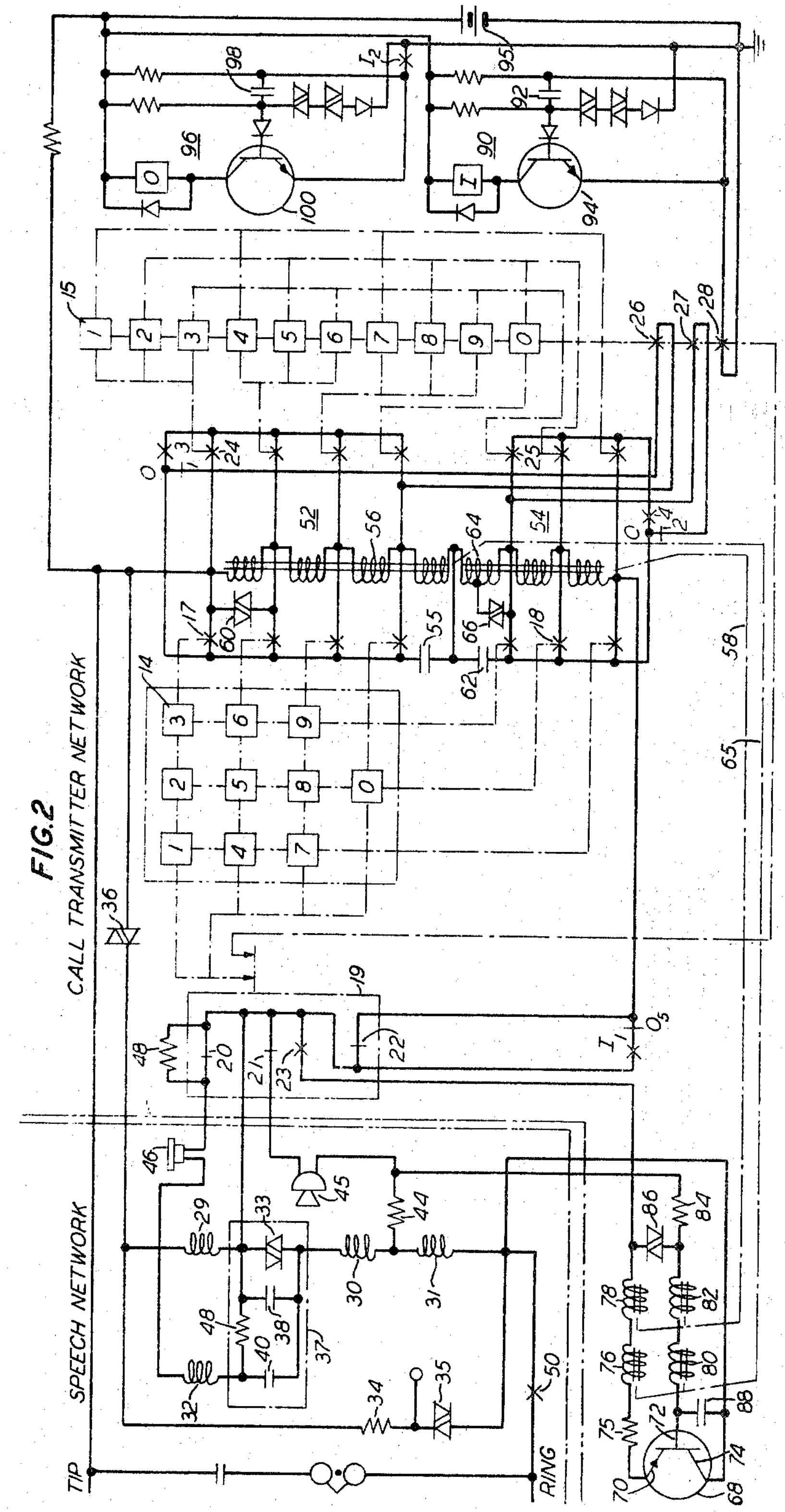
FIG. 2 is a schematic circuit diagram of the telephone set incorporating a first embodiment of the call transmitter.

Referring to FIG. 2, as indicated by the phantom lines extending between the pushbuttons 14 and two groups of normally open frequency selecting contacts 17 and 18, the actuation of any pushbutton results in the closure of one pair of contacts 17 and one pair of contacts 18. Each pushbutton 14 located in a common row operates the same pair of contacts 17 and each pushbutton located in a common column operates the same pair of contacts 18. Consequently, each pushbutton 14 operates a unique combination of contacts 17 and 18. As indicated by another phantom line, each pushbutton 14 also operates a common switch 19 that includes three pairs of normally closed contacts 20, 21, and 22 and one pair of normally open contacts 23.

Similarly, as indicated by the phantom lines extending between the keys 15 and two groups of normally open frequency selecting contacts 24 and 25, the actuation of any key results in the closure of one pair of contacts 24 and one pair of contacts 25. The contacts 24 are in parallel with the contacts 17 and the contacts 25 are in parallel with the contacts 18, and with the keys 15 numbered in order from top to bottom; each key advantageously closes the pairs of contacts 24 and 25 that are in parallel with the pairs of contacts 17 and 18 closed by the pushbutton 14 bearing the same number. Furthermore, as indicated by a phantom line extending vertically through the keys 15, the actuation of each key also closes three pairs of contacts 26, 27, and 28 and operates the common switch 19.

The contacts of the common switch 19 interconnect the call transmitter network with the speech network of the telephone set. The speech network is of the conventional antisidetone type and includes an induction coil comprising windings 29, 30, 31, and 32 coupled in series aiding relationship. The windings 29, 30, and 31 are connected in series with a varistor 33, and shunting this path are a resistor 34 and a varistor 35 utilized for telephone loop length compensation, both paths being in series with a varistor 36 of the call transmitter network. The varistor 33 is connected intermediate the windings 29 and 30 and serves as a nonlinear impedance element of an antisidetone network 37 comprisig capacitors 38 and 40 and a resistor 42 connected in parallel with the varistor 33.

The speech network further includes a transmitter circuit and a receiver circuit. The transmitter circuit comprises a resistor 44 and a telephone transmitter 45 connected in series with the normally closed contacts 21 of the common switch 19. One end of the transmitter circuit is connected to the junction between the winding 29 and the varistor 33 while the other end of the circuit is connected to the junction between the windings 30 and 31. The receiver circuit comprises the winding 32 of the induction coil and a telephone receiver 46 connected in series with the normally closed contacts 20 of the common switch 19, the contacts 20 normally shunting a resistor 48 in parallel therewith. One end of the receiver circuit is connected to the junction between the capacitor 40 and resistor 42 of the antisidetone network 37 and the other end of the circuit is connected to the junction between the winding 29 and the varistor 33.

The transmitter 45 is energized by current flow through the transmitter circuit when the handset 11 (FIG. 1) is removed from the cradle 12 whereby hook switch contacts 50 close to connect the telephone set to the central office. Local speech at the transmitter 45 produces a voltage across the winding 30 and then by the autotransformer action of the other windings of the induction coil, the voltage is increased and placed across the telephone line. The voltage induced in the winding 32 of the induction coil is substantially equal to the voltage drop across the antisidetone network 37 and therefore there is little or no voltage developed across the receiver circuit. The voltage produced by incoming speech, however, is not balanced out and appears across the receiver circuit whereby incoming speech is audible over the receiver 46.

The call transmitter network includes a pair of resonant circuits 52 and 54 connected in series with the normally closed contacts 22 of the common switch 19. The resonant circuit 52 comprises a capacitor 55 arranged to be connected across the entire length or across discrete portions of a tapped winding 56 of a transformer 58 by the frequency selecting contacts 17 or 24. The amplitude of the signal produced by the resonant circuit 52 is limited by a varistor 60 which is connected between two of the taps on the winding 56.

Similarly, the resonant circuit 54 comprises a capacitor 62 arranged to be connected across the entire length or across discrete portions of a tapped winding 64 of a transformer 65 by the frequency selecting contacts 18 or 25. The amplitude of the signal produced by the resonant circuit 54 is limited by varistor 66 which is connected between two of the taps on the winding 64.

The resonant circuits 52 and 54 form the frequency determining elements of a multifrequency feedback transistor oscillator comprising a transistor 68, the transformers 58 and 65, and associated circuitry. The transistor 68 includes an emitter electrode 70, a base electrode 72, and a collector electrode 74. The emitter electrode 70 is connected through a resistor 75, a winding 76 of the transformer 58, a winding 78 of the transformer 65, and the normally open contacts 23 of the common switch 19 to the junction between the winding 29 and the varistor 33. The base electrode 72 is connected through a winding 80 of the transformer 58, a winding 82 of the transformer 65, and resistors 84 and 44 to the junction between the windings 30 and 31 of the induction coil, and the collector electrode 74 is connected through the switch hook contacts 50 to the ring side of the telephone line. The windings 56, 76 and 80 of the transformer 58 are wound on a common core and have close magnetic intercoupling. Similarly, the windings 64, 78 and 82 of the transformer 65 are wound on a common core and are closely intercoupled. Base bias for the transistor 68 is derived from a varistor 86 connected across the base end emitter circuits, and a capacitor 88 connected across the base and collector circuits prevents a parasitic high frequency oscillation.

The call transmitter network further includes an interdigital relay I and an order relay O. The interdigital relay I includes a pair of normally open contacts $I_1$ connected parallel with the normally closed contacts 22 of the common switch 19 and a pair of normally open contacts $I_2$ connected in the energizing path of the order relay O. The order relay O includes a pair of normally closed contacts $O_1$, connected in series with the normally open contacts 26, the contacts $O_1$ and 26 serving to connect the capacitor 55 across a discrete portion of the tapped winding 56. Similarly, the order relay O includes a pair of normally closed contacts $O_2$ connected in series with the normally open contacts 27, the contacts $O_2$ and 27 serving to connect the capacitor 62 across a discrete portion of the tapped winding 64. In addition, the order relay O includes normally open contacts $O_3$ and $O_4$ respectively connected in series with the capacitors 55 and 62 outside of the contacts $O_1$ and $O_2$. Finally, the order relay O includes a pair of normally closed contacts $O_5$ connected in series with the normally open contacts $I_1$.

The interdigital relay I is associated with a timing circuit 90 that includes a capacitor 92 and transistor 94, the timing circuit acting to connect the relay I across a battery 95 forty milliseconds after the closure of the normally open contacts 28. In a like manner, the order relay O is associated with a timing circuit 96 that includes a capacitor 98 and a transistor 100, the timing circuit 96 acting to connect the relay O across the battery 95 forty milliseconds after the closure of the normally open contacts $I_2$. The charge on the battery 95 is advantageously maintained by current drawn from the telephone line.

Referring now to FIGS. 1 and 2, in the operation of this first embodiment of the call transmitter, the calling subscriber removes the handset 11 from the cradle 12, thereby closing the normally open hook switch contacts 50 and connecting the telephone set across the ring and tip sides of the telephone line. A direct current path is provided from the tip side of the telephone line through the varistor 36, the winding 29, the varistor 33, the windings 30 and 31, and the hook switch contacts 50 to the ring side of the telephone line.

As the transmitter 45 is connected through the normally closed contacts 21 of the common switch 19 and the resistor 44 across the varistor 33 and the winding 30 of the above direct current path, a portion of the line current flows through the transmitter circuit and energizes the transmitter. In addition, as the receiver 46 is connected in series with the winding 32, the alternating current voltage produced across the windings 29, 30, and 31 by incoming speech appears across the receiver circuit and is audible to the calling subscriber over the receiver. Finally, as the windings 56 and 64 of the resonant circuits 52 and 54, respectively, are connected through the normally closed contacts 22 of the common switch 19 across the varistor 36 and the winding 29 in the aforementioned direct current path, a portion of the line current also flows through the windings, storing energy therein.

In the manual operation of the call transmitter, the calling subscriber after listening for a dial tone commences to sequentially depress the pushbuttons 14 corresponding to the digits of the telephone number the subscriber wishes to call. As each pushbutton 14 is depressed, it closes the pairs of frequency selecting contacts 17 and 18 associated therewith, a different combination of pairs of frequency selecting contacts being closed by each pushbutton. The closing of one of the pairs of frequency selecting contacts 17 places the capacitor 55 across particular taps in the winding 56, and as the capacitor as a fixed capacitance, the length of the winding between these taps is determinative of the frequency at which resonant circuit 52 oscillates. Similarly, the closing of one of the frequency selecting contacts 18 places the capacitor 62 across particular taps on the winding 64, and the length of the winding between these taps is determinative of the frequency at which the resonant circuit 54 oscillates. The resonant circuits 52 and 54 are arranged to oscillate in different ranges of frequencies, and thus each pushbutton 14 when depressed selects a unique pair of frequencies.

The depression of a pushbutton 14 also actuates the common switch 19 to insert attenuation in the receiver circuit by opening the normally closed contacts 20 to place the resistor 48 in the receiver circuit. The common switch thereafter interrupts the transmitter circuit by opening the normally closed contacts 21 and enables the transistor oscillator by closing the normally open contacts 23 to connect the emitter and collector circuits across the varistor 33 and the windings 30 and 31 of the aforementioned direct current path whereby direct current is applied to the transistor 68. Finally, the common switch 19 shock excites the resonant circuits 52 and 54 by opening the normally closed contacts 22 to interrupt the flow of direct current through the windings 56 and 64 of the transformers 58 and 65, respectively.

The opening of the normally closed contacts 22 occurs subsequent to the closing of the normally open frequency selecting contacts 17 and 18 and thus the resonant circuits 42 and 54 oscillate at the frequencies determined by the particular frequency selecting contacts that are closed. The transistor 68, acting as an amplifier, sustains the shock excited oscillations at amplitudes regulated by the varistors 60 and 66, and these oscillations are coupled into the induction coil and thence onto the telephone line.

When a depressed pushbutton 14 is released, the contacts 22 close to terminate the oscillation of the resonant circuits 52 and 54 and once more permit current to flow through the windings 56 and 64. In addition, the contacts 23 open to disable the transistor oscillator, the contacts 21 close to energize the transmitter 45, and the contacts 20 close to remove the attenuation in the receiver circuit. The call transmitter network is thereby immediately ready for the depression of another pushbutton 14 and the signaling of another digit.

In the abbreviated operation of this first embodiment of the call transmitter, the calling subscriber again removes the handset 11 from the cradle 12 and listens for dial tone. He then actuates the key 15 associated with the subscriber he wishes to call, the subscriber's name being recorded on the tab 16 adjacent to the key. The actuation of the key 15 closes one of the pairs of frequency selecting contacts 24 and one of the pairs of frequency selecting contacts 25, the particular pairs being indicated by the phantom lines extending laterally from the key. The actuation of the key 15 also closes the pairs of contacts 26, 27, and 28, and operates the common switch 19.

The closure of the contacts 26 in combination with the closed contacts $O_1$ connects the capacitor 55 across preselected taps on the winding 56 to provide a particular resonant frequency for the resonant circuit 52, and the closure of the contacts 27 in combination with the closed contacts $O_2$ connects the capacitor 62 across preselected taps on the winding 64 to provide a particular resonant frequency for the resonant circuit 54. As described above, the operation of the common switch 19 sequentially opens the contacts 20 to insert attenuation in the receiver circuit, opens the contacts 21 to interrupt the transmitter circuit, closes the contacts 23 to enable the transistor oscillator, and opens the contacts 22 to shock excite the resonant circuits 52 and 54. The resonant circuits 52 and 54 oscillate at the frequencies selected by the closure of the contacts 26 and 27, and this multifrequency signal is transmitted out on the telephone line.

The closure of the contacts 28 initiates the charging of the capacitor 92 of the timing circuit 90 associated with the interidigital relay I, and after approximately forty milliseconds, the charge on the capacitor forward biases the transistor 94, turning it on. The interdigital relay I is thereupon connected across the battery 95 and energized. The contacts $I_1$ close, terminating the oscillation of the resonant circuits 52 and 54 and permitting direct current to again flow through the windings 56 and 64. In addition, the contacts $I_2$ close and initiate the charging of the capacitor 98 of the timing circuit 96 associated with the order relay O.

Approximately forty milliseconds later, the capacitor 98 forward biases the transistor 100 and turns it on. The order relay O is then connected across the battery 95 and energized. The contacts $O_1$ open to disconnect the capacitor 55 from across the portion of the winding 56 selected by the closed contacts 26, and the contacts $O_3$ close to connect the capacitor across the portion of the winding selected by the pair of closed contacts 24. Similarly, the contacts $O_2$ open to disconnect the capacitor 62 from across the portion of the winding 64 selected by the closed contacts 27, and the contacts $O_4$ close to connect the capacitor across the portion of the winding selected by the pair of closed contacts 25. At the same time the contacts $O_5$ open to shock excite the resonant circuits 52 and 54. The resonant circuits 52 and 54 oscillate at the selected frequency and this second multifrequency signal is transmitted out on the telephone line.

Thus it is seen that the actuation of any one of the keys 15 results in the automatic transmission of two multifrequency signals separated by an interdigital period during which no signal is transmitted. Since each of the keys 15 when actuated closes the contacts 26 and 27, the first multifrequency signal is always the same, this signal providing access to the central office memory. The second multifrequency signal varies according to the particular key 15 that is actuated and this signal corresponds to the order number of the subscriber associated with the actuated key. Each key 15 must be actuated for a minimum of one hundred twenty milliseconds to permit both signals to be received and recognized by the central office.

When the actuated key 15 is released, the common switch 19 returns to normal, and the signal transmission is terminated. At the same time, the contacts 28 open to deenergize the interdigital relay I and the order relay O. The calling subscriber then waits for the central office to complete the connection with the selected subscriber.

Figure 3:
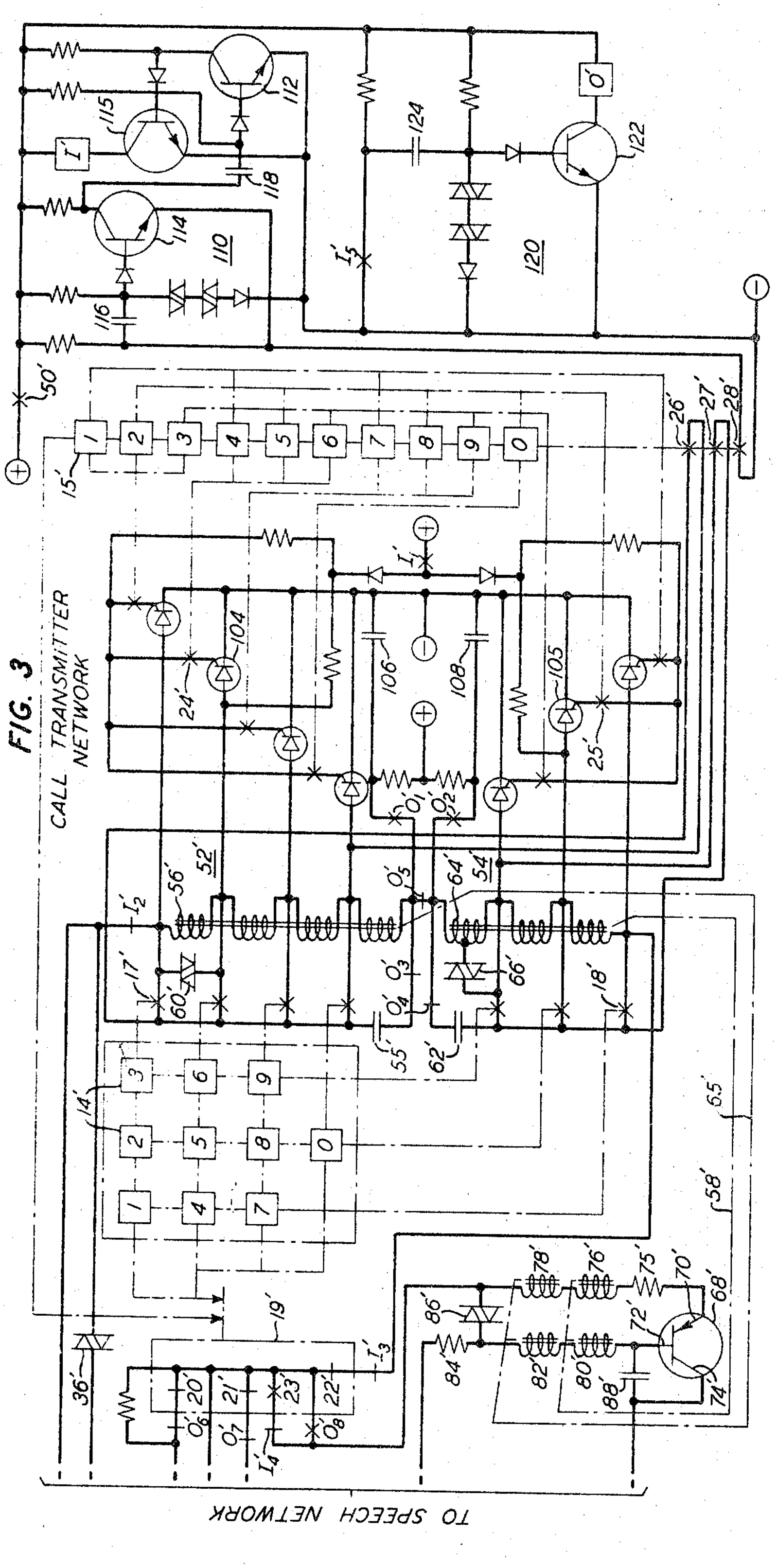
FIG. 3 is a schematic circuit diagram of a telephone set incorporating a second embodiment of the call transmitter.

In a second embodiment of the call transmitter, shown in FIG. 3, it is only necessary to actuate a key 15 for a little over forty milliseconds to effect the abbreviated operation of the call transmitter. In this embodiment, all the elements involved in the manual operation and many of the elements involved in the abbreviated operation are the same as the first embodiment, and each element that is the same is given the same reference character except that a prime is added.

As in the first embodiment, each key 15' when actuated closes one of the pairs of frequency selecting contacts 24' and one of the pairs of frequency selecting contacts 25'. However, each pair of contacts 24' is located in the gate path of an individual silicon controlled rectifier 104 and each pair of contacts 25' is located in the gate path of an individual silicon controlled rectifier 105. The anode of each of the silicon controlled rectifiers 104 is connected to an individual tap on the winding 56', while each cathode is connected to the negative side of a battery (not shown) and to one side of a capacitor 106. The other side of the capacitor 106 is connectable to a common end tap on the winding 56' by a pair of normally open contacts $O_1'$. Similarly, the anode of each of the silicon controlled rectifiers 105 is connected to an individual tap on the winding 64', while each cathode is connected to negative battery and to one side of a capacitor 108. The other side of the capacitor 108 is connectable to a common end tap on the winding 58' by a pair of normally open contacts $O_2'$. It is seen that the capacitors 106 and 108 are both connected across battery and are therefore normally charged to battery potential.

As in the first embodiment, the actuation of each key 15' also closes the normally open contacts 26', 27', and 28' and operates the common switch 19'. The closure of the contacts 26', 27', and 28' and the operation of the common switch 19' all perform essentially the same functions as in the first embodiment.

The second embodiment further includes the interdigital relay I' and the order relay O'. The interdigital relay I' operates in conjunction with a timing circuit 110 that includes three transistors 112, 114, and 115 and two capacitors 116 and 118, while the operate relay O' operates in conjunction with a timing circuit 120 that includes a transistor 122 and a capacitor 124.

The interdigital relay I' includes a pair of normally open contacts $I_1'$ connected in the positive battery path of the silicon controlled rectifiers 104 and 105 and pairs of normally closed contacts $I_2'$ and $I_3'$ in the line current path of the windings 56' and 64'. The interdigital relay I' also includes a pair of normally closed contacts $I_4'$ in series with the contacts 23' of the common switch 19', and a pair of normally open contacts $I_5'$ in the energizing path of the order relay O'.

The order relay O' includes, as indicated above, pairs of normally open contacts $O_1'$ and $O_2'$ intermediate capacitors 106 and 108 of the windings 56' and 64' respectively. The order relay O' also includes pairs of normally closed contacts $O_3'$ and $O_4'$ intermediate the capacitors 55' and 62' and the windings 56' and 64' respectively. Finally, the order relay O' includes a pair of normally closed contacts $O_5'$ intermediate the windings 56' and 64', pairs of normally closed contacts $O_6'$ and $O_7'$ respectively connected in series with the contacts 20' and 21' of the common switch 19', and a pair of normally open contacts $O_8'$ in parallel with the contacts 23' of the common switch 19' and the contacts $I_4'$.

In the abbreviated operation of the second embodiment of the call transmitter, the calling subscriber removes the handset 11 (FIG. 1) from the cradle 12 and thereby closes the hookswitch contacts 50' to provide battery for the timing circuit 110. Forward bias is applied to the transistor 112, and it is turned on.

After listening for dial tone, the calling subscriber actuates the key 15' associated with the subscriber he wishes to call. The actuated key 15' closes one of the pairs of frequency selecting contacts 24' and one of the pairs of frequency selecting contacts 25', the particular pairs being indicated by the phantom lines extending laterally from the actuated key. The actuated key 15' also closes the contacts 26', 27' and 28' and operates the common switch 19'.

The closure of the contacts 26' in combination with the closed contacts $O_3'$ connects the capacitor 55' across preselected taps on the winding 56', and the closure of the contacts 27' in combination with closed contacts $O_4'$ connects the capacitor 62' across preselected taps on the winding 64'. The operation of the common switch 19' sequentially opens the contacts 20' to insert attenuation in the receiver circuit, opens the contacts 21' to interrupt the transmitter circuit, closes the contacts 23' to enable the transistor oscillator, and opens the contacts 22' to shock excite the resonant circuits 52' and 54'. The resonant circuits 52' and 54' oscillate at the frequencies selected by the closure of the contacts 26' and 27', and this multifrequency signal is transmitted out on the telephone line.

The closure of the contacts 28' initiates the charging of the capacitor 116 of the timing circuit 110. After approximately forty milliseconds, the charge on the capacitor 116 forward biases the transistor 114 and turns it on. This initiates the charging of the capacitor 118 and reverse biases the transistor 112 to turn it off. When transistor 112 turns off, the collector voltage thereof rises and turns transistor 115 on. The interdigital relay I' is thereupon connected across battery and energized.

The contacts $I_1'$ close and apply positive battery to the anodes of the silicon controlled rectifiers 104 and 105. In addition, the closed contacts $I_1'$ apply positive battery through the pair of closed frequency selecting contacts 24' to the gate of the silicon controlled rectifier 104 connected thereto and through the pair of closed frequency selecting contacts 25' to the gate of the silicon controlled rectifier 105 connected thereto. Since the cathodes of the silicon controlled rectifiers 104 and 105 are all connected to negative battery, the two silicon controlled rectifiers to which gate current is applied turn on. The turned on silicon controlled rectifiers 104 and 105 serve as memory elements in the subsequent generation of the frequencies selected by the actuated key 15'.

The contacts $I_2'$ and $I_3'$ open to isolate the windings 56' and 64' from the line current path, and the contacts $I_4'$ open to disable the transistor oscillator and thereby terminate the transmission of the first multifrequency signal out on the telephone line. Finally, the contacts $I_5'$ close and initiate the charging of the capacitor 124 of the timing circuit 120 associated with the order relay O'. Once the interdigital relay I' is energized, which is approximately forty milliseconds after the key 15' is actuated, the actuated key may be released.

Approximately fifty milliseconds after the energization of the interdigital relay I', the charge on the capacitor 124 forward biases the transistor 122 and turns it on, energizing the order relay O'. The contacts $O_1'$ close whereby the capacitor 106 is connected across the portion of the winding 56' between the common end tap and the tap to which the turned on silicon controlled rectifier is connected, and the contacts $O_3'$ open, whereby the capacitor 55' is disconnected from the winding. The capacitor 106 discharges and shock excites the resonant circuit thereby established into oscillation at the frequency selected by the turned on silicon controlled rectifier 104. Similarly, the contacts $O_2'$ close, whereby the capacitor 108 is connected across the portion of the winding 46' between the common end tap and the tap to which the turned on silicon controlled rectifier 105 is connected, and the contacts $O_4'$ open, whereby the capacitor 62' is disconnected from the winding. The capacitor 108 discharges and shock excites the resonant circuit thereby established into oscillation at the frequency selected by the turned on silicon controlled rectifier 105.

At the same time, the contacts $O_5'$ open to remove the connection of the high impedance points of the two resonant circuits to each other. In addition, the contacts $O_6'$ open to assure attenuation in the receiver circuit, and the contacts $O_7'$ open to assure the disabling of the transmitter circuit. Finally, the contacts $O_7'$ close to enable the transistor oscillator, and the second multifrequency signal is transmitted out on the telephone line.

About fifty milliseconds thereafter, the charge on the capacitor 118 forward biases the transistor 112 turning it on. This turns transistor 115 off and deenergizes the interdigital relay I'. Contacts $I_1'$ open and turn off the silicon controlled rectifiers 104 and 105 that are activated, thereby terminating the oscillation of the resonant circuits. In addition, contacts $I_6'$ open in the charging path of the capacitor 124. The transistor 122 subsequently turns off and deenergizes the order relay O', and all the relay contacts return to normal.

Thus it is seen that in this second embodiment of the call transmitter, it is only necessary for the key 15' to be actuated for approximately forty milliseconds, during which time the first multifrequency signal is transmitted and the interdigital relay I' is energized. The call transmitter thereafter automatically takes over the functions performed by the actuated key and provides an interdigital period during which no signal is transmitted, followed by transmission of the second multifrequency signal. Although the two embodiments herein described only transmit two multifrequency signals, it is obvious that the same principles can be employed to transmit three or more of such signals.

What is claimed is:

1. A call transmitter comprising:
a signal generator having a frequency determining circuit, the frequency determining circuit being selectively tunable;
a plurality of keys, each of which is associated with an individual subscriber;
means responsive to the actuation of each key for selecting a frequency of the frequency determining circuit peculiar to the actuated key; and
means responsive to the actuation of each key for first tuning the frequency determining circuit to a frequency common to all of the keys and generating this common frequency, and thereafter tuning the frequency determining circuit to the frequency peculiar to the actuated key and generating this peculiar frequency, the signals so generated resulting in the calling of the subscriber associated with the actuated key.

2. A call transmitter comprising:
a multifrequency generator having two frequency determining circuits, each of which is selectively tunable;
a plurality of keys, each of which is associated with an individual subscriber;
first means responsive to the actuation of each key for selecting a frequency of each frequency determining circuit, the pair of frequencies being peculiar to the actuated key;
second means responsive to the actuation of each key for first tuning the frequency determining circuits to a pair of frequencies common to all the keys and generating this common pair of frequencies, and thereafter tuning the frequency determining circuits to the pair of frequencies peculiar to the actuated key and generating this pair of peculiar frequencies, the signals so generated resulting in the calling of the subscriber associated with the actuated key.

3. A call transmitter as in claim 2 wherein each frequency determining circuit comprises a capacitor and a winding having a plurality of taps along the length thereof, the circuit being tunable by the connection of various taps on the winding across the capacitor.

4. A call transmitter as in claim 3 wherein the first key responsive means selects a tap on each winding and the second key responsive means subsequently connects the selected tap to one side of the associated capacitor, the other side of the associated capacitor being permanently connected to a common tap on the winding.

5. A call transmitter as in claim 3 wherein the first key responsive means selects a tap on each winding and connects it to one side of the associated capacitor, and the second key responsive means subsequently connects the other side of the associated capacitor to a common tap on the winding.

6. A call transmitter as in claim 2 wherein the second key responsive means includes timing means for terminating the generation of the pair of frequencies common to all of the keys and then subsequently initiating the generation of the pair of frequencies peculiar to the actuated key.

7. A call transmitter as in claim 2 wherein the second key responsive means includes a first and a second timing means, the operation of the first timing means being initiated upon the actuation of a key, the first timing means after the elapse of a predetermined period of time terminating the generation of the pair of frequencies common to all of the keys and initiating the operation of the second timing means, the second timing means after the elapse of a predetermined period of time initiating the generation of the pair of frequencies peculiar to the actuated key.

8. A call transmitter as in claim 7 wherein the second key responsive means further includes a third timing means, the operation of which is initiated by the first timing means after the elapse of a predetermined period of time, the third timing means after the elapse of a predetermined period of time terminating the generation of the pair of frequencies peculiar to the actuated key.

9. A call transmitter as in claim 2 wherein the first key responsive means includes memory means for selecting the frequencies peculiar to the actuated key of the frequency determining circuits.

10. A call transmitter as in claim 2 further including a plurality of pushbuttons and means responsive to the actuation of each pushbutton for tuning the frequency determining circuits to a pair of frequencies peculiar to the pushbutton and generating this pair of peculiar frequencies.

References Cited

UNITED STATES PATENTS

| | | |
|---|---|---|
| 3,215,783 | 11/1965 | Watts. |
| 3,301,967 | 1/1967 | Plyer. |
| 3,351,715 | 11/1967 | Gasser. |

KATHLEEN H. CLAFFY, Primary Examiner

B. P. SMITH, Assistant Examiner